(12) United States Patent
Cai

(10) Patent No.: US 12,185,729 B2
(45) Date of Patent: Jan. 7, 2025

(54) DOUGH PRODUCTS AND METHOD OF MAKING THE SAME

(71) Applicant: Conagra Foods RDM, Inc., Chicago, IL (US)

(72) Inventor: Rongxuan Cai, Omaha, NE (US)

(73) Assignee: Conagra Foods RDM, Inc., Chicago, IL (US)

( * ) Notice: Subject to any disclaimer, the term of this patent is extended or adjusted under 35 U.S.C. 154(b) by 695 days.

(21) Appl. No.: 16/552,286

(22) Filed: Aug. 27, 2019

(65) Prior Publication Data

US 2020/0068906 A1    Mar. 5, 2020

Related U.S. Application Data

(60) Provisional application No. 62/724,968, filed on Aug. 30, 2018.

(51) Int. Cl.
| | |
|---|---|
| *A21D 8/04* | (2006.01) |
| *A21D 2/16* | (2006.01) |
| *A21D 2/18* | (2006.01) |
| *A21D 8/06* | (2006.01) |
| *A21D 13/44* | (2017.01) |

(52) U.S. Cl.
CPC ............ *A21D 8/047* (2013.01); *A21D 2/165* (2013.01); *A21D 2/181* (2013.01); *A21D 8/06* (2013.01); *A21D 13/44* (2017.01)

(58) Field of Classification Search
CPC .......... A21D 13/43; A21D 13/44; A21D 8/06; A21D 2/181
See application file for complete search history.

(56) References Cited

U.S. PATENT DOCUMENTS

| | | | | |
|---|---|---|---|---|
| 3,039,878 | A | * | 6/1962 | Ganske ................ A21D 10/005 426/555 |
| 3,066,029 | A | * | 11/1962 | Jeffreys .................. A21D 8/047 426/60 |
| 3,862,339 | A | | 1/1975 | Balboni |
| 4,018,898 | A | | 4/1977 | Tollefson et al. |

(Continued)

FOREIGN PATENT DOCUMENTS

| | | |
|---|---|---|
| EP | 0691078 A2 | 1/1996 |
| WO | 2010034061 A1 | 4/2010 |

OTHER PUBLICATIONS

Grant DE 1916440 Derwent abstract 2 pages (Year: 1969).*

(Continued)

*Primary Examiner* — Felicia C Turner
(74) *Attorney, Agent, or Firm* — Ryan T. Grace; Advent, LLP

(57) ABSTRACT

Embodiments of the disclosure can relate to dough products and method of making the same. In one example embodiment of the disclosure, a method for making a yeast-based dough product may include preparing a yeast broth by dispersing an amount of yeast into water and mixing the amount of yeast with water until a homogenized solution is reached; mixing the yeast broth with a pre-blend of dry ingredients to form a batter, and without allowing a resting period, baking the batter at an elevated temperature. The amount of yeast utilized may be determined based at least in part on achieving instantaneous gassing without a rise in batter volume when mixing the yeast broth with the pre-blend of dry ingredients.

20 Claims, 12 Drawing Sheets

(56) References Cited

U.S. PATENT DOCUMENTS

| | | | |
|---|---|---|---|
| 4,604,289 A * | 8/1986 | Spanier | A21D 2/18 |
| | | | 426/62 |
| 2006/0216388 A1 * | 9/2006 | Christensen | A21D 2/145 |
| | | | 426/549 |
| 2010/0015279 A1 * | 1/2010 | Zhang | A21D 13/066 |
| | | | 426/62 |
| 2012/0121758 A1 | 5/2012 | Becker | |
| 2018/0132493 A1 | 5/2018 | Cai et al. | |
| 2019/0191723 A1 | 6/2019 | Cai | |
| 2019/0191724 A1 | 6/2019 | Cai | |

OTHER PUBLICATIONS

Dan RO 112229 Derwent Abstract 1997 2 pages (Year: 1997).*
International Search Report and Written Opinion for PCT/US2019/048301, dated Dec. 17, 2019.

* cited by examiner

| DESCRIPTION | CONTROL Grams | % | TEST 1 Grams | % | TEST 2 Grams | % | TEST 3 Grams | % |
|---|---|---|---|---|---|---|---|---|
| WATER | 477.10 | 47.71 | 477.10 | 47.98 | 477.10 | 48.00 | 477.10 | 46.82 |
| WHOLE LIQUID EGG | 10.40 | 1.04 | 10.40 | 1.05 | 10.40 | 1.05 | 10.40 | 1.02 |
| SOY LECITHIN | 1.05 | 0.11 | 1.05 | 0.11 | 1.05 | 0.11 | 1.05 | 0.10 |
| SOYBEAN OIL | 16.90 | 1.69 | 16.90 | 1.70 | 16.90 | 1.70 | 16.90 | 1.66 |
| SOFT WHEAT FLOUR | 378.77 | 37.88 | 378.77 | 37.88 | 378.77 | 37.88 | 378.77 | 37.88 |
| DEXTROSE | 28.10 | 2.81 | 28.10 | 2.83 | 28.10 | 2.83 | 28.10 | 2.76 |
| DEFATTED SOY FLOUR | 24.40 | 2.44 | 24.40 | 2.45 | 24.40 | 2.45 | 24.40 | 2.39 |
| CREAM BUTTERMILK | 10.70 | 1.07 | 10.70 | 1.07 | 10.70 | 1.08 | 10.70 | 1.05 |
| GRANULATED SUGAR | 32.70 | 3.27 | 32.70 | 3.29 | 32.70 | 3.29 | 32.70 | 3.21 |
| SODIUM BICARBONATE | 4.87 | 0.49 | | | | | | |
| WHEY | 4.59 | 0.46 | 4.59 | 0.46 | 4.59 | 0.46 | 4.59 | 0.45 |
| SODIUM ALUMINUM PHOSPHATE | 2.69 | 0.27 | | | | | | |
| SODIUM ACID PYROPHOSPHATE | 2.40 | 0.24 | | | | | | |
| MONOCALCIUM PHOSPHATE MONOHYDRATE | 0.67 | 0.07 | | | | | | |
| SALT | 4.69 | 0.47 | 4.69 | 0.47 | 4.69 | 0.47 | 4.69 | 0.46 |
| YEAST | | | 5.00 | 0.50 | 5.00 | 0.50 | 30.00 | 2.94 |
| TOTAL | 1000.00 | 100.00 | 994.40 | 99.78 | 994.03 | 100.00 | 1019.03 | 100.00 |

FIG. 2

| DESCRIPTION | TEST 4 | | TEST 5 | |
|---|---|---|---|---|
| | GRAMS | % | GRAMS | % |
| WATER | 477.10 | 47.50 | 477.10 | 45.46 |
| WHOLE LIQUID EGG | 10.40 | 1.04 | 10.40 | 0.99 |
| SOY LECITHIN | 1.05 | 0.10 | 1.05 | 0.10 |
| SOYBEAN OIL | 16.90 | 1.68 | 16.90 | 1.61 |
| HARD WHEAT FLOUR | 378.77 | 37.71 | 378.77 | 36.09 |
| DEXTROSE | 28.10 | 2.80 | 28.10 | 2.68 |
| DEFATTED SOY FLOUR | 24.40 | 2.43 | 24.40 | 2.33 |
| CREAM BUTTER | 10.70 | 1.07 | 10.70 | 1.02 |
| SUGAR | 32.70 | 3.26 | 32.70 | 3.12 |
| WHEY | 4.59 | 0.46 | 4.59 | 0.44 |
| SALT | 4.69 | 0.47 | 4.69 | 0.45 |
| YEAST | 15.00 | 1.49 | 60.00 | 5.72 |
| TOTAL | 1004.40 | 100.00 | 1049.40 | 100.00 |

FIG. 3

| DESCRIPTION | TEST 6 (PRIOR ART) | | TEST 7 | |
|---|---|---|---|---|
| | GRAMS | % | GRAMS | % |
| WATER | 477.10 | 50.59 | 477.10 | 49.28 |
| WHOLE EGG LIQUID | 10.40 | 1.10 | 10.40 | 1.07 |
| WHEAT FLOUR | 378.77 | 40.16 | 378.77 | 39.13 |
| SUGAR | 32.70 | 3.47 | 32.70 | 3.38 |
| WHEY | 4.59 | 0.46 | 4.59 | 0.46 |
| SALT | 4.69 | 0.50 | 4.69 | 0.48 |
| YEAST | 15.00 | 1.59 | 40.00 | 4.13 |
| TOTAL | 923.25 | 100.00 | 948.15 | 100.00 |

FIG. 5

| DESCRIPTION | TEST 8 | |
|---|---|---|
| | GRAMS | % |
| HARD WHEAT FLOUR | 510.46 | 28.63 |
| WHOLE WHEAT FLOUR | 531.30 | 29.80 |
| WATER | 620.00 | 34.78 |
| SOYBEAN OIL | 41.67 | 2.34 |
| DEXTROSE | 11.88 | 0.67 |
| SUGAR | 10.42 | 0.58 |
| DOUGH IMPROVERS | 12.96 | 0.72 |
| SALT | 9.48 | 0.53 |
| YEAST | 34.73 | 1.95 |
| TOTAL | 1782.89 | 100.00 |

FIG. 6A

| | RESTING (ROOM TEMP 70F) | FERMENTING (85F) | PROOFING (110F) | FLAVOR SENSORY SCORE | TEXTURE SENSORY SCORE |
|---|---|---|---|---|---|
| TREATMENT 1 (PRESENT INVENTION) | 0.0 | 0.0 | 0.0 | 5.0 | 4.0 |
| TREATMENT 2 (PRIOR ART) | 30.0 | 0.0 | 0.0 | 4.0 | 4.1 |
| TREATMENT 3 (PRIOR ART) | 30.0 | 30.0 | 0.0 | 3.0 | 4.2 |
| TREATMENT 4 (PRIOR ART) | 30.0 | 30.0 | 20.0 | 2.5 | 4.5 |

NOTE: FLAVOR AND TEXTURE LIKING SCORES ARE 1 (LIKE THE LEAST) TO 5 (LIKE THE MOST)

FIG. 6B

| DESCRIPTION | TEST 9 (PRIOR ART) GRAMS | % | TEST 10 GRAMS | % |
|---|---|---|---|---|
| FLOUR | 514.93 | 30.03 | 510.46 | 28.63 |
| WHOLE WHEAT FLOUR | 535.95 | 31.25 | 531.30 | 29.80 |
| WATER | 542.96 | 31.66 | 620.00 | 34.78 |
| SOYBEAN OIL | 42.04 | 2.45 | 41.67 | 2.34 |
| SUGAR | 22.49 | 1.31 | 22.30 | 1.25 |
| BAKING POWDER | 21.02 | 1.24 | | |
| BAKING SODA | | | 2.00 | 0.11 |
| DOUGH IMPROVERS | 10.51 | 0.61 | 10.42 | 0.58 |
| SALT | 9.56 | 0.56 | 9.48 | 0.53 |
| SOY PROTEINS | 1.65 | 0.10 | 1.65 | 0.10 |
| YEAST | | | 34.73 | 1.95 |
| TOTAL | 1700.00 | 100.00 | 1782.89 | 100.00 |

FIG. 7A

|  | RESTING | FERMENTING | PROOFING | FLAVOR SENSORY SCORE | TEXTURE SENSORY SCORE |
|---|---|---|---|---|---|
| CONTROL, PRIOR ART | 0 | 0 | 0 | 2 | 2.5 |
| TEST, PRESENT INVENTION | 0 | 0 | 0 | 5 | 4 |

NOTE: FLAVOR AND TEXTURE LIKING SCORES ARE 1 (LIKE THE LEAST) TO 5 (LIKE THE MOST)

FIG. 7B

DOUGH PRODUCTS AND METHOD OF MAKING THE SAME

CROSS-REFERENCE TO RELATED APPLICATIONS

The present application claims the benefit under 35 U.S.C. § 119(e) of U.S. Provisional Application Ser. No. 62/724,968, entitled DOUGH PRODUCTS AND METHOD OF MAKING THE SAME, filed Aug. 30, 2018. U.S. Provisional Application Ser. No. 62/724,968 is hereby incorporated by reference in its entirety.

BACKGROUND

Although yeast has been the dominant leavening agent in bakery because of favored textural and flavor characteristics of yeast-based products, chemical leaveners are still in use in many applications where production efficiency and controlled leavening action at the time of baking are important. For example, most commercial pancake products today are made using chemical leaveners. Chemical leavening may create an easily controlled leavening action in the griddle. When chemical leaveners are used in bakery productions, the goods produced normally have a very different flavor and texture of the product as compared to yeast-based products. Typically, chemical leaveners carry an off-flavor and sometimes can have a bitter note or an aftertaste. The texture of a chemically-leavened product is typically biscuit-like where the product possesses a short bite, in contrast to the chewy texture from a yeast product.

Yeast products create a distinct flavor and texture, and are used in many traditional products, like breads and pizzas, but also are desired in many other products, like pancakes and waffles that are not commercially made using yeast. Additionally, a natural leavener like yeast provides an opportunity to label a food product as including more natural ingredients than a product using a chemical leavener. Such cleaner labels have been a trend in recent years in the food industry. However, yeast leavening can occur too soon or too late in the stage of baking. Either case will result in wasted batters or unacceptable products. Additionally, yeast leavening traditionally includes a long period of fermentation, making it inefficient for commercial pancake preparation.

SUMMARY

This summary is provided solely as an introduction to subject matter that is fully described in the detailed description and drawings. The summary should not be considered to describe essential features nor be used to determine the scope of the claims. Moreover, it is to be understood that both the summary and the detailed description are examples and explanatory only and are not necessarily restrictive of the subject matter claimed.

Certain embodiments of the disclosure may include non-proofed, non-fermented, and non-rested yeast-based dough products and methods of making the same. According to one embodiment of the disclosure, a method for making a yeast-based dough product may include: preparing a yeast broth, wherein preparing the yeast broth may include dispersing an amount of yeast into water, mixing the amount of yeast with water until a homogenized solution may be reached. The method for may further include mixing the yeast broth with a pre-blend of dry ingredients to form a batter, and without allowing a resting period, baking the batter to produce a baked product. The amount of yeast mentioned previously may be determined based at least in part on achieving instantaneous gassing without a rise in batter volume when mixing the yeast broth with the pre-blend of dry ingredients.

According to another embodiment of the disclosure, a dough product having no chemical leaveners may be provided. The dough product may include batter baked at an elevated temperature, where the batter may include a mixture of a yeast broth comprising a homogenized solution of an amount of yeast and water mixed with sugar and a pre-blend of dry ingredients. The batter may be baked without allowing a resting period and the amount of yeast in the yeast broth may be determined based at least in part on achieving instantaneous gassing without a rise in batter volume when mixing the yeast broth with the pre-blend of dry ingredients.

According to another embodiment of the disclosure, a method for making a yeast-based dough product may include: preparing a yeast broth, wherein preparing the yeast broth may include dispersing an amount of yeast into water, adding oil; and mixing the amount of yeast with water and oil until a homogenized solution is reached. The method may further include mixing the yeast broth with a pre-blend of dry ingredients to form a dough, sheeting the dough to form a crust; and without allowing a resting period, baking the crust to produce a baked product; wherein the amount of yeast in preparing the yeast broth may be determined based at least in part on achieving instantaneous gassing without a rise in dough volume when mixing the yeast broth with the pre-blend of dry ingredients.

BRIEF DESCRIPTION OF THE DRAWINGS

FIG. 2 is a tabulated depiction of example implementations of the process for preparing a yeast-based dough product in accordance with an embodiment of the present disclosure.

FIG. 3 is a tabulated depiction of example implementations of the process for preparing a yeast-based dough product in accordance with an embodiment of the present disclosure.

FIG. 5 is a tabulated depiction of example implementations of the process for preparing a yeast-based dough product in accordance with an embodiment of the present disclosure.

FIGS. 6A and 6B are tabulated depictions of example implementations of the process for preparing a yeast-based dough product in accordance with an embodiment of the present disclosure.

FIGS. 7A and 7B are tabulated depictions of example implementations of the process for preparing a yeast-based dough product in accordance with an embodiment of the present disclosure.

DETAILED DESCRIPTION

Figure 1:
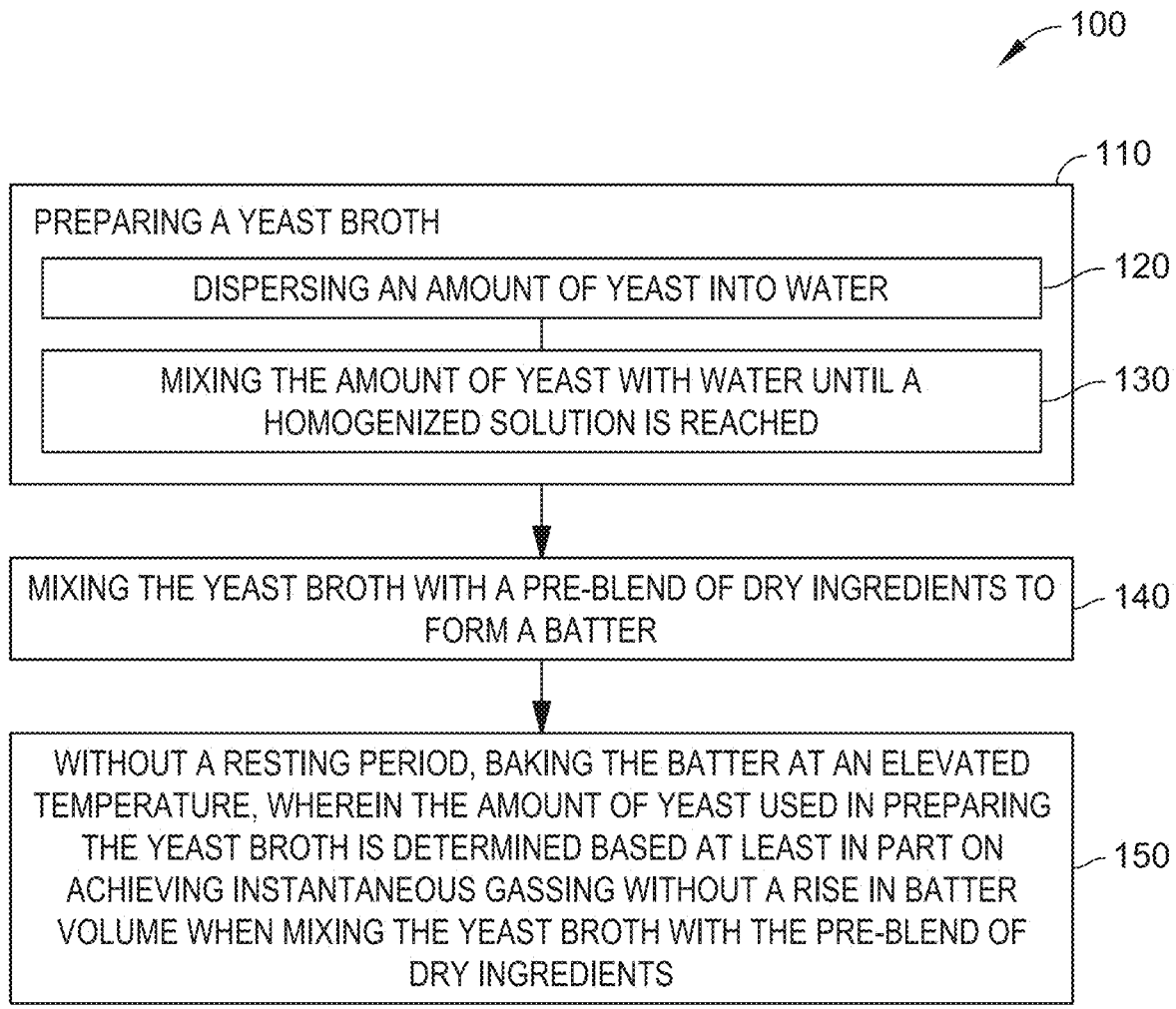
FIG. 1 is a flowchart of a process for preparing a yeast-based dough product in accordance with an embodiment of the present disclosure.
Figure 4A:
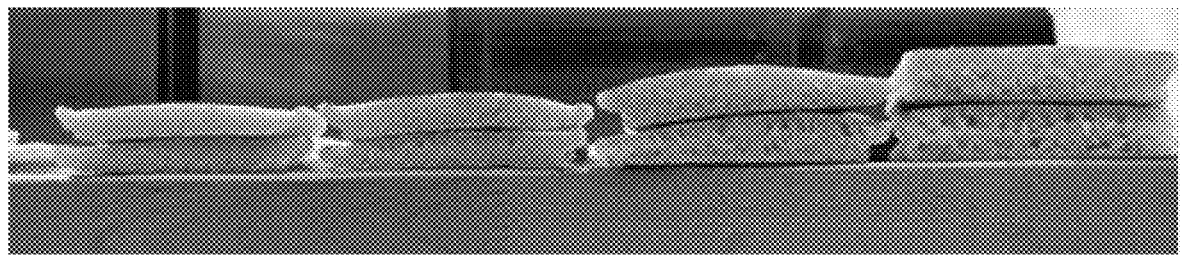
FIGS. 4A and 4B are depictions of example implementations of the process for preparing a yeast-based dough product in accordance with an embodiment of the present disclosure.
Figure 4B:

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, and structural, logical, or electrical changes may be made, without departing from the scope of the claimed subject matter. The following detailed description is, therefore, not to be taken in a limiting sense, and the scope is defined by the appended claims and their equivalents. Like numbers refer to like elements throughout.

Certain embodiments described herein relate to yeast-based dough products and methods for making the same. For example, a method for making a yeast-based dough product having no chemical leavener and without providing a resting period for the dough before baking is described in greater detail herein. The method may include: preparing a yeast broth, wherein preparing the yeast broth may include dispersing an amount of yeast into water, mixing the amount of yeast with water until a homogenized solution is reached. The method may optionally include adding sugar to the homogenized solution and stirring until the sugar is dissolved well in the yeast broth. The method for making the yeast-based dough product may further include mixing the yeast broth with a pre-blend of dry ingredients to form a batter, and without allowing a resting period, baking the batter at an elevated temperature. The amount of yeast mentioned previously may be determined based at least in part on achieving instantaneous gassing without a rise in batter volume when mixing the yeast broth with the pre-blend of dry ingredients.

One or more technical effects associated with certain embodiments herein may include, but are not limited to, increased commercial production and speed or producing baked dough products, resultant dough products with a chewy texture as opposed to a texture having a short bite (often attributed to food having chemical leaveners), and resultant dough products having a golden brown surface color following baking. By way of an example embodiment, yeast-leavened pancakes may have larger surface cavities as a result of larger bubbles during leavening compared to the small surface cavities of a chemically-leavened pancake. Certain other embodiments herein may also have a technical effect of reducing preparation time and providing a more natural product.

As used herein the term "chemical leavener" means a leavener that is produced by chemical means, such as by direct synthesis or via a chemical isolation method. Example components of chemical leaveners include combinations of an acidic component with a basic component, such as a phosphate combined with a carbonate or bicarbonate. For example, chemical leaveners can include, but are not limited to, combinations of phosphates or sulfates (e.g., monocalcium phosphates, calcium phosphate, sodium aluminum phosphate, sodium aluminum sulfate, sodium acid pyrophosphate, etc.) with carbonates or bicarbonates (e.g., sodium bicarbonate, potassium bicarbonate, ammonia carbonate, etc.).

As used herein, the terms "rest" and "resting period" are used to refer to allowing the dough to rest or otherwise remain untouched by individuals or processing equipment for a period of time (e.g., from a few minutes up to an hour) but without allowing any significant fermentation to occur. Resting is typically performed at ambient temperature, e.g., at about 65° F. to about 80° F. A "resting period" does not refer to a time during which a dough is being portioned for a baking step. A "resting period" also does not refer to a time during which a dough or a portioned dough is in transition to a baking step, unless such transition time is made sufficiently lengthy to permit a dough or portioned dough to rest during such transition.

It may be noted that, throughout the disclosure, the terms dough and batter may be used interchangeably. The processes and products described in this disclosure may be applicable to products and processes of dough and batter.

Referring now to FIG. 1, an example process 100 for making a yeast-based dough product is depicted. In general, operations of the disclosed process (e.g., process 100) may be performed in an arbitrary order, unless otherwise provided in the claims. The yeast-based dough product may include a bakery product, a pancake, a waffle, a pizza, a flat bread, and so on.

In the process 100 illustrated in FIG. 1, a yeast broth may be prepared 110. Preparing 110 a yeast broth includes dispersing 120 an amount of yeast into water. Step 120 may be performed at different temperatures. In an example embodiment of the disclosure, step 120 may be performed at prevailing ambient conditions. As an example, temperature of water used in step 120 may be from about 60° F. to about 80° F. Yeast used in step 120 may be refrigerated or frozen and may or may not be thawed or heated. In implementations, the amount of yeast used in preparing the yeast broth in process 100 is determined based at least in part on achieving instantaneous gassing without a rise in batter volume during a subsequent mixing step (e.g., step 140 described below) where yeast broth may be mixed with the pre-blend of dry ingredients. For example, yeast in an amount of about 2.0% to about 6.0% by weight of pancake batter was determined to achieve instantaneous gassing without a rise in batter volume when homogenized with water prior to mixing with the pre-blend of dry ingredients, however, the amount of yeast is not limited to this example range. Preparing 110 the yeast broth further includes mixing 130 the amount of yeast with water until a homogenized solution is reached. Once step 130 has been performed, the temperature of the homogenized solution may be in the range of about 65° F. to about 70° F. Controlling the temperature of the homogenized solution can facilitate controlling yeast activity during process 100, such as during a baking step of the dough. Preparing 110 the yeast broth may further include mixing sugar with the homogenized solution to provide a yeast broth that is combined with dry ingredients of the dough to release carbon dioxide upon mixing, which is accelerated during baking (e.g., on a griddle surface).

The process 100 proceeds further to step 140, where the yeast broth may be mixed with a pre-blend of dry ingredients to form a batter. In an example implementation, the mixing 140 includes blending the yeast broth with the pre-blend of dry ingredients at a low speed with a kitchen mixer. The dry ingredients in step 140 may include one or more of: flour, salt, flavoring, dairy powder, and so on, depending on the recipe for the yeast-based dough product. Examples of flours for inclusion in the pre-blend of dry ingredients include, but are not limited to, wheat flour, barley flour, buckwheat flour, corn flour, corn meal, spelt flour, soy flour, millet flour, flaxseed flour, potato flour, potato starch flour, quinoa flour, rice flour, rye flour, sorghum flour, tapioca flour, and combinations thereof. Examples of salts for inclusion in the pre-blend of dry ingredients include, but are not limited to, sodium salts, potassium salts, magnesium salts, manganese salts, and mixtures thereof. Examples of flavoring ingredients for inclusion in the pre-blend of dry ingredients include, but are not limited to, fruit (e.g., apples, pears, apricots, peaches, plums, strawberries, blueberries, cranberries, etc.), nuts (e.g., pecans, walnuts, peanuts, cashews, macadamia nuts, brazil nuts, hazelnuts, almonds, etc.), vegetables (e.g., potatoes, carrots, corn, beets, peppers, etc.), proteins (e.g., meats, soy proteins, etc.), or the like. The dairy powder can include, but is not limited to, whey powder.

The pre-blend may be prepared by blending the dry ingredients at a controlled room temperature, for instance, at about 65° F. to about 75° F. The dry ingredients may be blended for various amounts of time. For example, the dry ingredients may be blended for about 1 minute to about 2 minutes. During laboratory testing, minimal bubble action was observed on the surface of the yeast broth during mixing with the pre-blend of dry ingredients during step 140, however the batter likely exhibited small nucleation during the mixing step 140. Combining the yeast broth and the pre-blend of dry ingredients facilitates proper leavening during a subsequent baking step.

The example process 100 for making a yeast-based dough product may further include baking 150 the batter at an elevated temperature without a resting period between the mixing step 140 and the baking step 150. For instance, the period between the mixing step 140 and the baking step 150 may be the time required to portion the mixed batter and transfer the portioned batter to a baking device, resulting in a substantially continuous process from mixing to baking. In an example implementation, the time period between mixing 140 and baking 150 is less than about 10 minutes, less than about 5 minutes, less than about 3 minutes, and the like. In contrast, a resting step may involve maintaining the batter or dough in a standstill condition for a certain amount of time (or intentionally conveying the batter or dough for a time period sufficient to rest before baking) outside of a baking process of the batter or dough. For example, resting periods for dough products can involve allowing the dough product to remain stationary for a leavening process to occur, such as at room temperature (e.g., about 60° F. to about 85° F.), although other resting temperatures can be utilized.

The baking step 150 may be performed using a convection oven, a griddle, a conventional oven, a Turbochef brand oven, and so on. During the baking step 150, yeast may be activated due to the elevated temperature of the griddle or other heating apparatus. The yeast activity during the baking step 150 may be controlled by controlling one or more of: a temperature of water in the yeast broth, temperature of the yeast broth, batter temperature, concentration of yeast in the yeast broth, or baking temperature. A range of elevated temperatures for baking the batter was tested. In an example embodiment of the disclosure, for yeast leavened pancakes, elevated temperatures may be kept below 450° F. For instance, the elevated temperatures, such as, for example, griddles maintained from about 350° F. to about 400° F., and so on may be considered depending on the dough product being made. The yeast-based dough product may have substantially equivalent or superior properties to dough products made through traditional yeast processes such as long fermenting step, resting and proofing or dough products containing chemical additives, such as chemical leaveners. Example comparisons are provided further herein with respect to FIGS. 2 through 8F.

During tests, when batter prepared by process 100 was placed on a griddle for baking, bubbles were observed immediately. This may indicate that elevated temperatures at the griddle greatly accelerated the yeast activity. The dough product may not rise properly if the temperature did not accelerate the yeast activity or if it did not accelerate enough yeast activity. In this example embodiment, a proper leavening of the dough product was observed.

In another example embodiment of the disclosure, a dough product having no chemical leaveners is disclosed. The dough product may include batter baked at an elevated temperature. For example, the elevated temperature can be from about 350° F. to about 400° F. The batter may include a mixture of a yeast broth including a homogenized solution of an amount of yeast and water and a pre-blend of dry ingredients. The batter may be baked without allowing a resting period and wherein the amount of yeast in the yeast broth may be determined based at least in part on achieving instantaneous gassing without a rise in batter volume when the yeast broth is mixed with the pre-blend of dry ingredients.

Example Implementations

FIGS. 2 through 8F illustrate various example implementations of dough products prepared via the process 100 described earlier or comparison samples. It may be noted that comparisons are made with dough products made using other example methods. The following serves as example implementations and in no way should be considered limiting.

Referring now to FIG. 2, pancakes were prepared according to formulas labeled Control, Test 1, Test 2, and Test 3 in the table shown. The Control sample had chemical leaveners and did not have yeast, while Test 1, Test 2, and Test 3 had varying yeast amounts with no chemical leaveners. In preparation of the Control sample, Test 1, and Test 2, all the dry ingredients were blended for 1 minute before liquids were added. The content was mixed for 1 minute at low speed and 15 seconds at high speed. The Control sample was not rested and about 50 grams of batter was portioned and cooked on a griddle immediately following mixing of the dry ingredients and liquid ingredients. The batter for Test 1 and Test 2 was set aside to rest at ambient temperature for resting periods of 1 hour and 2 hours, respectively. About 50 grams of batter for each of Test 1 and Test 2 was then portioned and griddled to pancake at a temperature of 400° F. According to an example embodiment of the disclosure, Test 3 represented the sample to be prepared according to the process 100. In Test 3, a yeast broth was prepared before mixing the batter. The yeast was dissolved in the water and mixed for 1 minute. Sugar was then added into the yeast solution and the content was blended for 0.5 minutes until the sugar was dissolved. All other dry ingredients as a pre-blend were then mixed with the yeast broth for 1 min at low speed and 15 seconds at high speed to form the batter. The batter was not allowed to rest and was portioned and cooked on a griddle immediately following mixing of the dry ingredients and liquid ingredients. About 50 grams of the Test 3 batter was then portioned and griddled to pancakes at a temperature setting of 375° F.

All pancakes prepared from the Control, Test 1, Test 2, and Test 3 were let sit and cooled to room temperature, and then frozen overnight at −10° F. The pancakes were thawed for 6 hours and baked using a convection oven at 350° F. for 5 minutes. The pancakes were evaluated for flavor and texture characteristics. Results of the pancake evaluation showed that all three test samples (Test 1, Test 2, and Test 3) had a yeast flavor and a slightly chewy texture, typical for a yeast leavened product. Results also indicated that the yeast flavor might have masked some of the buttermilk flavor but overall all the tests were acceptable. The results indicated that a pancake prepared according to method of the present disclosure had a yeast flavor and a slightly chewier characteristic, distinct from a chemically-leavened product (Control sample). The results further indicated that the pancake prepared according to the present disclosure without a resting period (Test 3) made a pancake which is comparable to a pancake made with a resting period of 1 to 2 hours using yeast fermentation (Test 1 and Test 2, respectively).

Referring now to FIG. 3, pancakes were prepared according to formulas labeled Test 4 and Test 5 in the table shown, and then compared at different resting times to evaluate the non-resting technology of the present disclosure. Test 4 was conducted using a pancake making procedure commonly used in ordinary households. During the pancake making of Test 4, yeast is dissolved into about 50 grams of a warm (90° F.) sugar solution and stirred to disperse well, sitting for about 5 minutes, and then all the other materials were added. The content was mixed for 1.5 minutes using a KitchenAid brand mixer, and then portioned to griddle at 0 minutes, 15 minutes, 30 minutes and 45 minutes of resting. A water temperature of 65° F. was used and batter temperature was 68° F. after mixing. The batter had a Bostwick Consistometer measurement of 6.9 cm/10 seconds. Test 5 represented an example embodiment of process 100. During the pancake making of Test 5, a yeast broth was prepared before mixing the batter. The yeast was dissolved in the water (65° F.) and mixed for 1 minute. The amount of yeast was approximately four times higher by weight than that of Test 4 and was selected to achieve instantaneous gassing without a rise in batter volume when mixing the yeast broth with the pre-blend of dry ingredients. Sugar was then added into the yeast solution and the content was mixed until the sugar was dissolved. All dry ingredients were then added, and the content was mixed for 1.5 minutes to form the batter. Batter temperature was 68° F. and had a Bostwick Consistometer measurement of 6.8 cm/10 seconds. The batter was portioned to griddle at time intervals of 0 minutes, 15 minutes, 30 minutes, and 45 minutes of resting. For all preparations of Test 4 and Test 5, 50 grams of the batter was portioned and griddled to pancakes at a temperature setting of 375° F. All pancakes sat and cooled to room temperature before evaluation.

The pancakes prepared according to the Test 4 and Test 5 formulations were evaluated for volume, flavor, and texture characteristics. Referring to the pancake images shown in FIGS. 4A and 4B, the result of the pancake evaluation showed that while pancake produced using a conventional household method in Test 4 was not acceptable until after a rest time of about 45 minutes (FIG. 4A, height 9 mm for 0 minute rest, 11 mm for 15 minute rest, 14 mm for 30 minute rest, and 16 mm for 45 minute rest from left to right), the volume of the pancake was acceptable at 0 minutes of rest time for Test 5 using the method of example disclosure of process 100 (FIG. 4B, height around 15 mm for each rest period (0 minutes, 15 minutes, 30 minutes, and 45 minutes from left to right)). The texture of the Test 5 pancakes prepared according to the present disclosure was fluffier and more appealing than Test 4. Both tests had a yeasty taste and a chewier texture property and both formulas were acceptable. The results further indicating that the product made using the example disclosure of process 100 is acceptable without requiring a resting period prior to baking.

Referring now to FIG. 5, lean yeast pancakes were prepared according to formulas labeled Test 6 and Test 7 in the table shown. Products were evaluated for volume, texture, and flavor characteristics after baking. For Test 6, the procedure described with respect to the Test 4 formula of FIG. 3 was used to simulate a common household baking procedure. Test 7 represented an example embodiment of process 100. During the pancake making of Test 7, a yeast broth was prepared before mixing the batter. The yeast was dissolved in the water (65° F.) and mixed for 1 minute. The amount of yeast was approximately two and two-thirds (2 and 2/3) times higher by weight than that of Test 6 and was selected to achieve instantaneous gassing without a rise in batter volume when mixing the yeast broth with the pre-blend of dry ingredients. Sugar was then added into the yeast solution and the content was mixed for 1.5 minutes until the sugar was dissolved. All dry ingredients as a pre-blend were then added and mixed for 1.5 minutes to form the batter. The Test 6 batter was allowed to rest for 50 minutes before baking. The Test 7 batter was portioned to griddle without any rest time. For each preparation of Test 6 and Test 7, 50 grams of the batter was portioned and griddled to pancakes at a temperature setting of 375° F. All pancakes sat and cooled to room temperature before evaluation.

The pancakes prepared according to the Test 6 and Test 7 formulations were evaluated for volume, flavor, and texture characteristics. Results of the pancake evaluation showed that while pancakes produced using a common household procedure in Test 6 was acceptable at a rest time of about 50 minutes, the test product (Test 7) was acceptable at 0 minutes of rest time. The results further indicated that the pancake prepared according to the present disclosure without a resting period (Test 7) made an acceptable pancake which is comparable to a pancake made with a resting period of 50 minutes before baking (Test 6).

Referring now to FIGS. 6A and 6B, doughs were prepared according to formulas labeled Test 8 in the table shown in FIG. 6A. Various dough making processes in different amounts of resting, fermentation, and proofing were compared. Flavor and textural properties of the example embodiment of process 100 and other preparations having different resting, fermentation, and proofing treatments were evaluated by panelists for sensory preference scores.

Dough was prepared by blending the dry ingredients for 1 minute at low speed using a Hobart brand mixer. Yeast and all the liquid ingredients, including water and oil, as a pre-blended liquid broth, were then added, and the content was mixed for 2 minutes at low speed and 4 minutes at high speed. Dough was then sheeted to about 5 mm in thickness and cut to about 300 grams in a square of about 10×10 inch in the form a flat bread. Flat dough sheets were treated based on the treatments labeled Treatment 1, Treatment 2, Treatment 3, or Treatment 4 in the table shown in FIG. 6B. After the treatment, dough sheets were baked in a convection oven for 6 minutes to form flat bread. The flatbread was allowed to cool before evaluation by panelists.

Flavor and texture scores of the differing treatments are indicated in the table of FIG. 6B, where a score of 1 indicates the least preferred and a score of 5 indicates the most preferred. As can be seen from the table, the method of example embodiment of process 100 with zero resting and no fermentation or proofing (Treatment 1) produced a product with superior flavor characteristics with only slightly decreased texture scores. Results indicated that the process 100 produced products having a much better flavor and an acceptable texture characteristic, while being available in a finished consumable state about 30 minutes sooner than the product of Treatment 2, about 60 minutes sooner than the product of Treatment 3, and about 80 minutes sooner than the product of Treatment 4.

Referring now to FIGS. 7A and 7B, doughs were prepared according to formulas in the table of FIG. 7A. Test 10 represented an example embodiment of process 100, whereas Test 9 represented a dough made with chemical leaveners with no proof or no fermentation periods and zero resting period. Flavor and textural property of the example embodiment of the present disclosure with no chemical leaveners and the other preparation having chemical leaveners were evaluated by panelists for sensory preference scores.

Dough was prepared by blending the dry ingredients for 1 minute at low speed using a Hobart brand mixer. For the control of Test 9 with chemical leaveners, all dry ingredients were blended together for 1 minute and water and oil were then added. The content was mixed for 2 minutes at low speed and 4 min at high speed. For the example embodiment of the present disclosure, all dry ingredients were blended for 1 minutes. Yeast and all the liquid ingredients, including water and oil were then added, and the content was mixed for 2 minutes at low speed and 4 minutes at high speed. Dough was then sheeted to about 5 mm in thickness and cut to about 300 grams in a square of about 10×10 inch in the form a flat bread pizza crust. Dough sheets were then topped with 100 grams sauce and 200 grams cheese to form a pizza. The doughs prepared according to Test 9 and Test 10 were not allowed any rest time and proceeded to baking right away using a convection oven for 10 minutes. The pizzas were allowed to cool down before evaluation by the panelists.

The flavor and texture scores of the crust of Test 9 and the example embodiment of the present disclosure (Test 10), are listed in the table of FIG. 7B, where a score of 1 indicates the least preferred and a score of 5 indicates the most preferred. As can be seen from the table of FIG. 7B, product prepared according to Test 10 had a flavor score and a texture score that greatly exceeded those corresponding to the product prepared according to Test 9. Results indicated that the example embodiment of the present disclosure produced products without chemical leaveners with enhanced flavor and texture characteristics compared to a control procedure using chemical leaveners.

Referring now to FIGS. 8A through 8F, pancakes were prepared according to formulas labeled Control, Test 1, and Test 3 in the table shown in FIG. 2 and analyzed to compare cell opening structures of each pancake when prepared without a resting step. The Control sample had chemical leaveners and did not have yeast, the Test 3 sample represented an example embodiment prepared according to the process 100 having yeast, no chemical leavener and prepared without a resting period, and Test 1 represented a sample having yeast in an amount insufficient to achieve instantaneous gassing without a rise in batter volume when mixed. The Control sample and the Test 3 sample were made as described with respect to FIG. 2, without any rest time after batter mixing before baking. The Test 1 sample was made as described with respect to FIG. 2 except that after mixing the batter, the batter was portioned to sizes of 50 grams to a griddle at 375° F., without a resting step, similar to the Test 3 sample. The pancakes were allowed to cool to room temperature and then cut to a 2.75 inch diameter via cookie cutter to produce a uniform sized sample for each sample of the Control, Test 1, and Test 3 formulas. The samples were then horizontally sliced through the middle (e.g., parallel with the griddle surface) to reveal the interior cell openings. The slices of pancake were then analyzed using C-Cell instrumentation (C-Cell Imaging System manufactured by Calibre Control International, Ltd. in Warrington, UK).

Figure 8A:
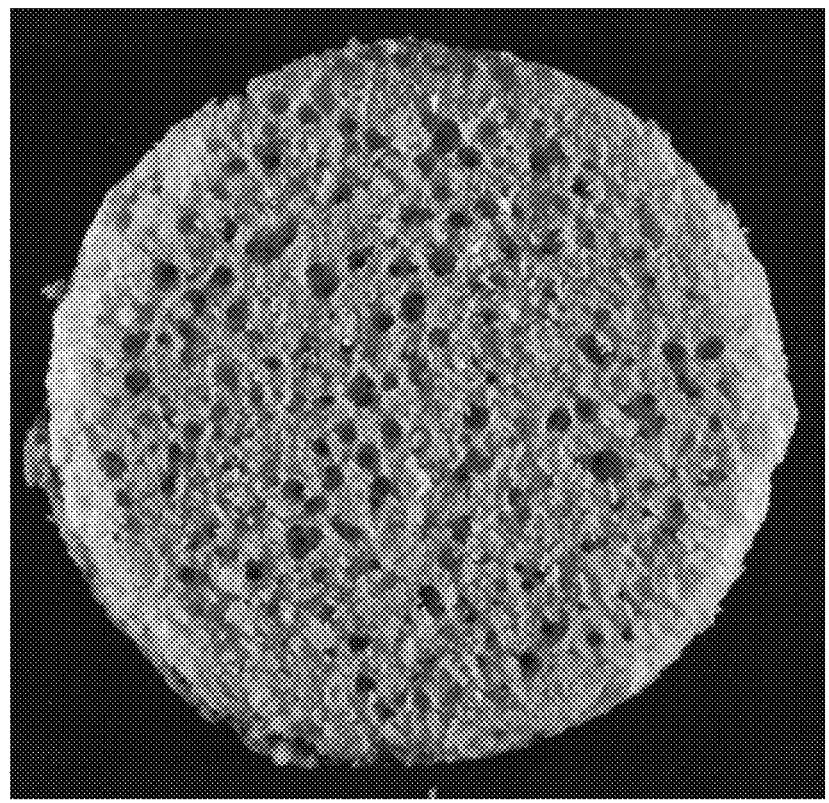
FIGS. 8A, 8C, and 8E are images of example implementations of sample sliced pancakes to illustrate the cell opening structures.
Figure 8B:
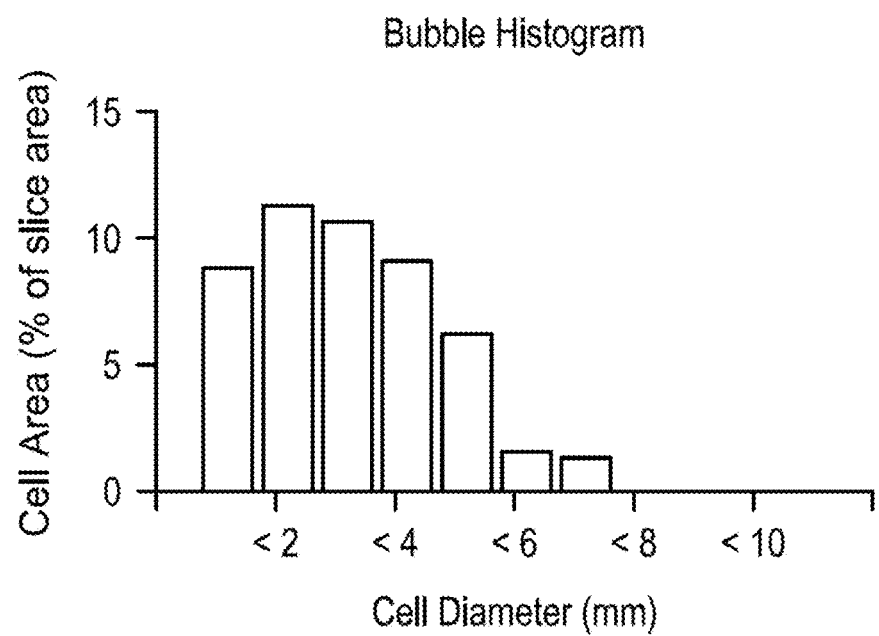
FIGS. 8B, 8D, and 8F are bubble histograms of the example implementations of sample sliced pancakes of FIGS. 8A, 8C, and 8E, respectively, showing cell area for various cell diameters.
Figure 8C:
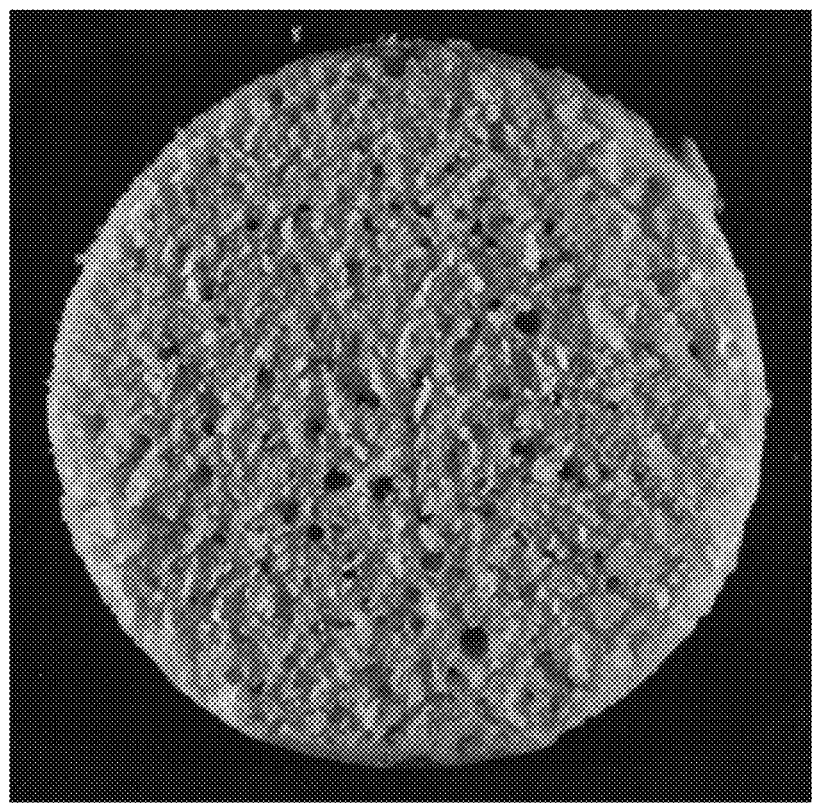
Figure 8D:
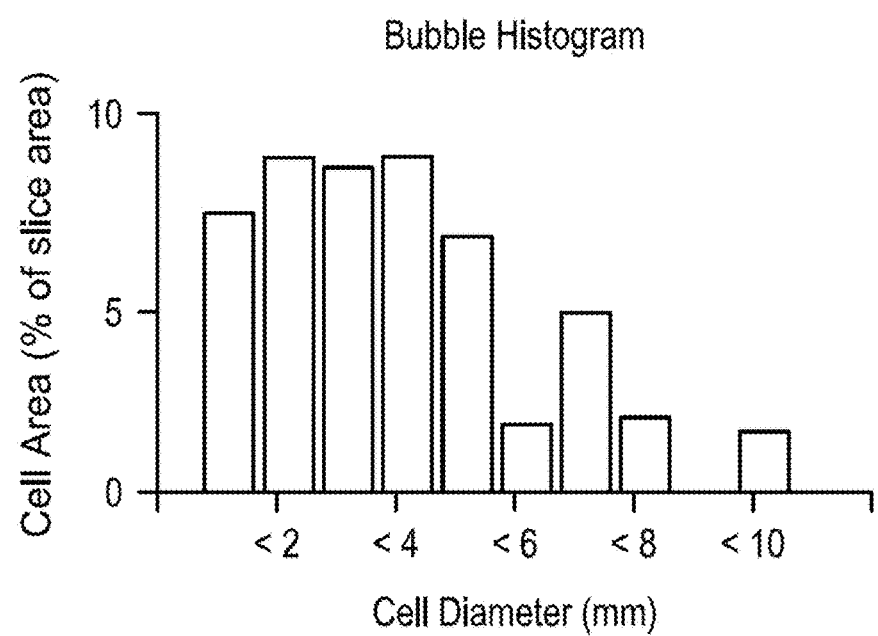
Figure 8E:
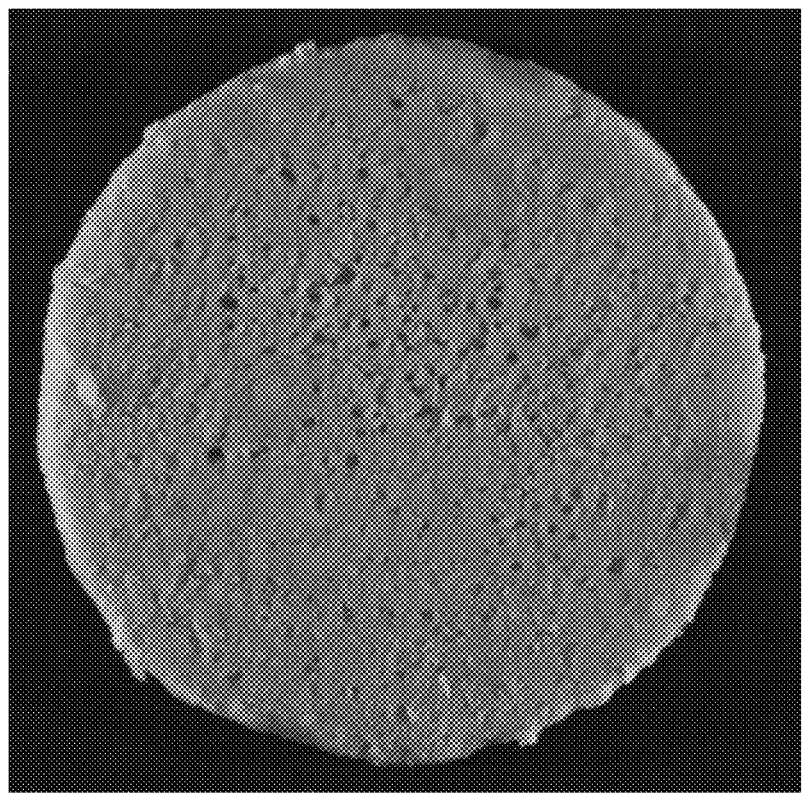
Figure 8F:
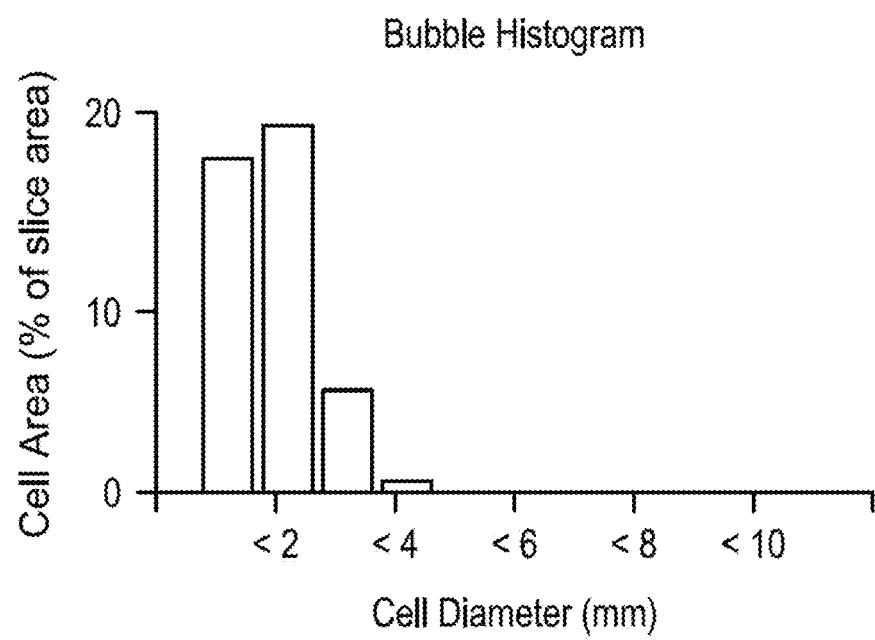

Images of the slices are shown in FIGS. 8A, 8C, and 8E and bubble histograms of the C-Cell analysis are shown in FIGS. 8B, 8D, and 8F. The slice shown in FIG. 8A and the bubble histogram of the C-Cell analysis shown in FIG. 8B correspond to the Control sample. The slice shown in FIG. 8C and the bubble histogram of the C-Cell analysis shown in FIG. 8D correspond to the Test 3 sample (i.e., the sample representing an example embodiment prepared according to the process 100). The slice shown in FIG. 8E and the bubble histogram of the C-Cell analysis shown in FIG. 8F correspond to the Test 1 sample.

Referring to FIGS. 8A and 8B, the cell opening of the Control sample had a bubble size distribution ranging from about 1 mm to about 8 mm, and each incremental size had over 10% for 2 mm and 3 mm sizes, and less than 10% for other sizes. The total bubble cell area was 49.1%. Referring to FIGS. 8C and 8D, the cell opening of the Test 3 sample had a bubble size distribution ranging from about 1 mm to about 10 mm, and each incremental size had less than 10% of the total sliced area. The total bubble cell area was 50.4%. Therefore, cell openings of the Control sample using chemical leavened are more uniform while those of the Test 3 sample had a wider variation in cell sizes, which is generally desirable for a flat bakery product. Referring to FIGS. 8E and 8F, the cell opening of the Test 1 sample had a size distribution from about 1 mm to about 3 mm with a small percentage of bubble size of 4 mm. The percentage of 1 mm and 2 mm bubble sizes were close to 20% and the total bubble cell area is only 42.9%. Results indicated that the Test 3 sample produced a pancake that has a sponge cell opening structure similar to, but with larger cell openings than a pancake provided by the Control sample using chemical leavening. Results also indicated that the Test 1 sample produced a dense dough mass instead of a sponge when no resting periods were used following mixing before baking.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A method for making a yeast-based dough product, the method comprising:
preparing a yeast broth including:
dispersing an amount of yeast into water; and
mixing the amount of yeast with water until a homogenized solution is reached;
mixing the yeast broth with a pre-blend of dry ingredients to form a batter, the pre-blend of dry ingredients including wheat flour; and
without allowing a resting period or a fermentation period, baking the batter to produce a baked product,
wherein the amount of yeast in preparing the yeast broth is determined based at least in part on achieving instantaneous gassing without a rise in batter volume when mixing the yeast broth with the pre-blend of dry ingredients.

2. The method of claim 1, wherein preparing a yeast broth further comprises mixing sugar with the homogenized solution.

3. The method of claim 1, wherein mixing the yeast broth with a pre-blend of dry ingredients to form a batter further comprises blending the yeast broth with the pre-blend of dry ingredients at a first speed for a first duration and at a second speed for a second duration, the second speed higher than the first speed.

4. The method of claim 1, further comprising controlling yeast activity during baking by controlling one or more of: temperature of water in the yeast broth, temperature of the yeast broth, batter temperature, concentration of yeast in the yeast broth, or baking temperature.

5. The method of claim 4, wherein controlling yeast activity during baking includes controlling the temperature of the yeast broth between about 65° F. to about 70° F.

6. The method of claim 1, wherein baking the batter comprises one or more of: baking the batter using a conventional oven, baking the batter using a convection oven, baking the batter using a microwave oven, or baking the batter on a griddle.

7. The method of claim 1, wherein the dry ingredients are free of chemical leaveners and comprise one or more of: salt, flavoring, dairy powder, egg, proteins, starch, or whole grain flour.

8. The method of claim 1, wherein the pre-blend is prepared by blending the dry ingredients at a temperature between about 65° F. to about 75° F.

9. The method of claim 1, wherein baking the batter to produce a baked product includes baking the batter at a temperature below 450° F.

10. A dough product having no chemical leaveners, comprising:
a batter baked at an elevated temperature, the batter including a mixture of:
a yeast broth having a homogenized solution of an amount of yeast and water; and
a pre-blend of dry ingredients including wheat flour;
wherein the batter is baked without allowing a resting period or a fermentation period and wherein the amount of yeast in the yeast broth is determined based at least in part on achieving instantaneous gassing without a rise in batter volume when mixing the yeast broth with the pre-blend of dry ingredients.

11. The dough product of claim 10, wherein the dough product is one or more of: a pancake, a waffle, a pizza, a flat bread, or a bread.

12. The dough product of claim 10, wherein the dry ingredients are free of chemical leaveners and comprise one or more of: salt, flavoring, dairy powder, egg, proteins, starch, or whole grain flour.

13. The dough product of claim 10, wherein the yeast broth further comprises sugar mixed with the homogenized solution.

14. A method for making a yeast-based dough product, the method comprising:
preparing a yeast broth, including:
dispersing an amount of yeast into water;
adding oil; and
mixing the amount of yeast with water and oil until a homogenized solution is reached;
mixing the yeast broth with a pre-blend of dry ingredients to form a dough, the pre-blend of dry ingredients including wheat flour;
sheeting the dough to form a crust; and
without allowing a resting period or a fermentation period, baking the crust to produce a baked product;
wherein the amount of yeast in preparing the yeast broth is determined based at least in part on achieving instantaneous gassing without a rise in dough volume when mixing the yeast broth with the pre-blend of dry ingredients.

15. The method of claim 14, wherein mixing the yeast broth with a pre-blend of dry ingredients to form a dough further comprises blending the yeast broth with the pre-blend of dry ingredients at a first speed for a first duration and at a second speed for a second duration, the second speed higher than the first speed.

16. The method of claim 14, further comprising controlling yeast activity during baking by controlling one or more of: temperature of water in the yeast broth, temperature of the yeast broth, dough temperature, concentration of yeast in the yeast broth, or baking temperature.

17. The method of claim 14, wherein baking the crust comprises one or more of: baking the crust using a conventional oven, baking the crust using a convection oven, baking the crust using a microwave oven, or baking the crust on a griddle.

18. The method of claim 14, wherein the dry ingredients are free of chemical leaveners and comprise one or more of: whole wheat flour, salt, flavoring, dairy powder, egg, protein, starch, soy protein, or whole grain flour.

19. The method of claim 1, wherein the amount of yeast includes from about 2.0% to about 6.0% by weight of the batter.

20. The method of claim 1, wherein the batter is free of chemical leaveners, and wherein the amount of yeast includes from about 2.0% to about 6.0% by weight of the batter.

* * * * *